No. 870,361. PATENTED NOV. 5, 1907.
J. D. HARE.
SLED BRAKE.
APPLICATION FILED APR. 2, 1907.
2 SHEETS—SHEET 1.
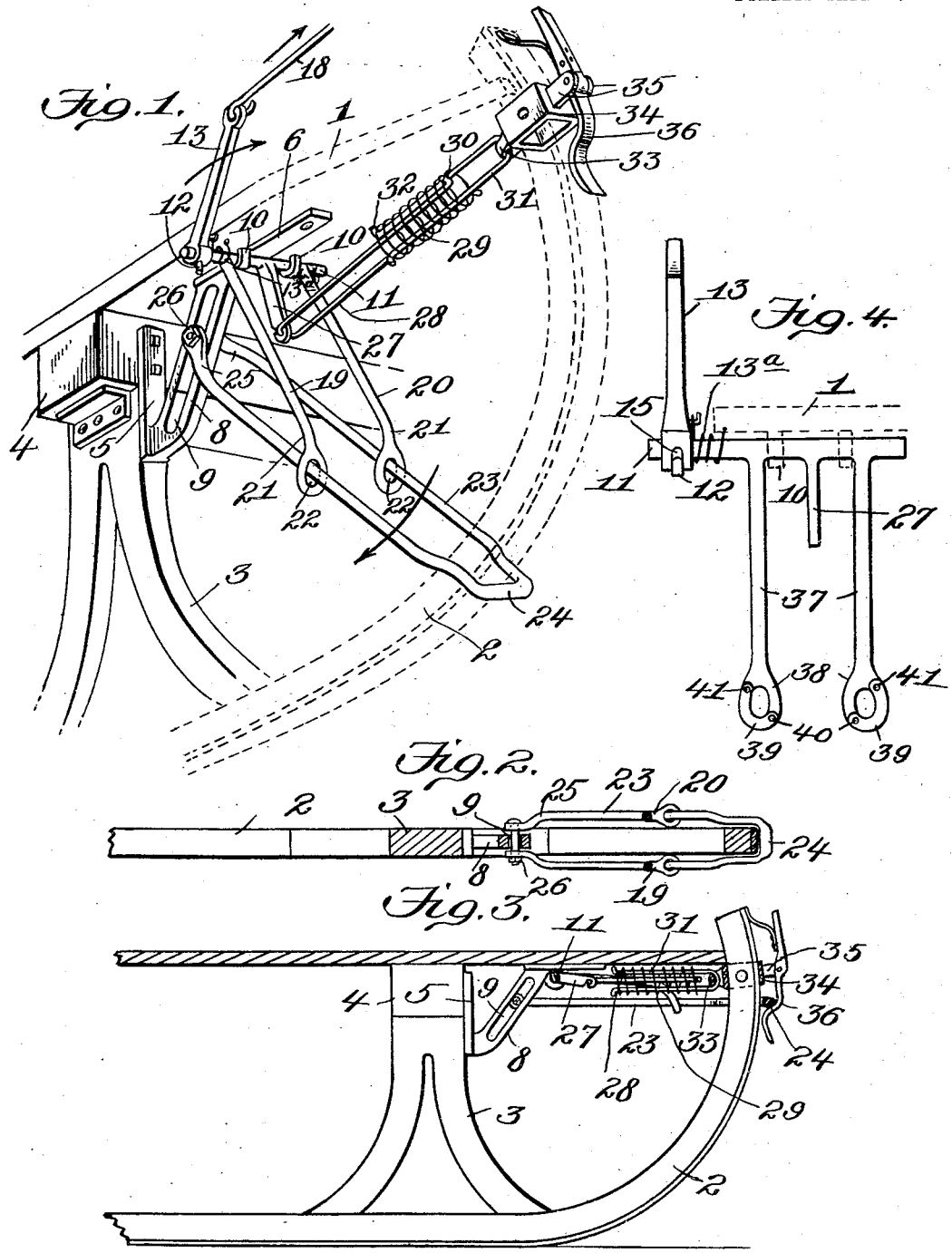
Witnesses:
G. F. Kesler
W. B. Keefer
Inventor
John D. Hare
By James L. Norris.
Atty.

No. 870,361. PATENTED NOV. 5, 1907.
J. D. HARE.
SLED BRAKE.
APPLICATION FILED APR. 2, 1907.
2 SHEETS—SHEET 2.
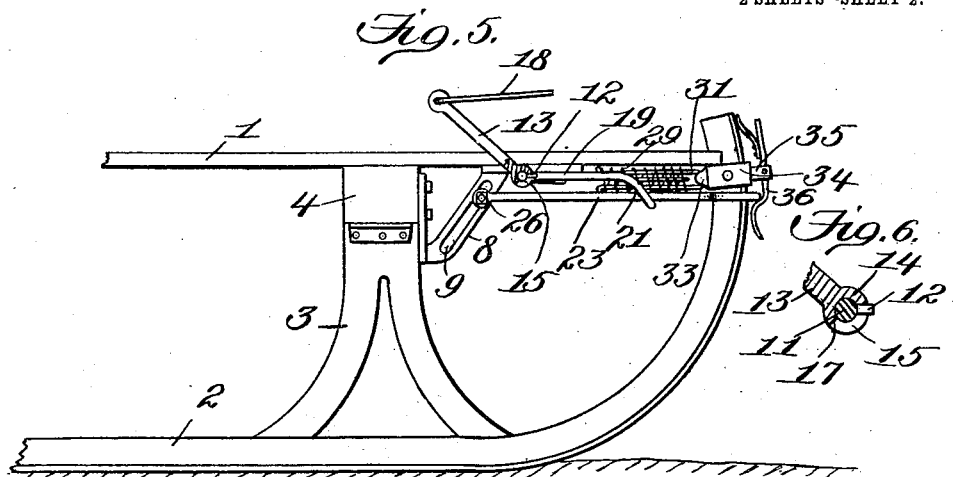
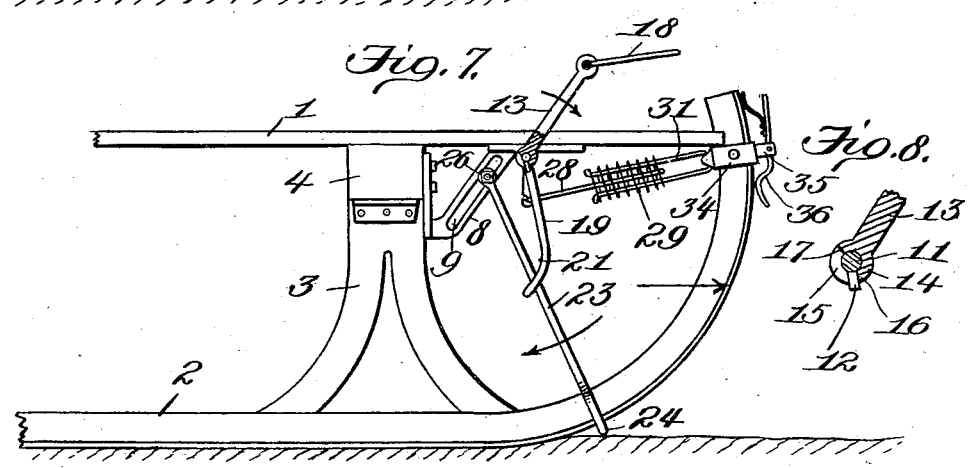
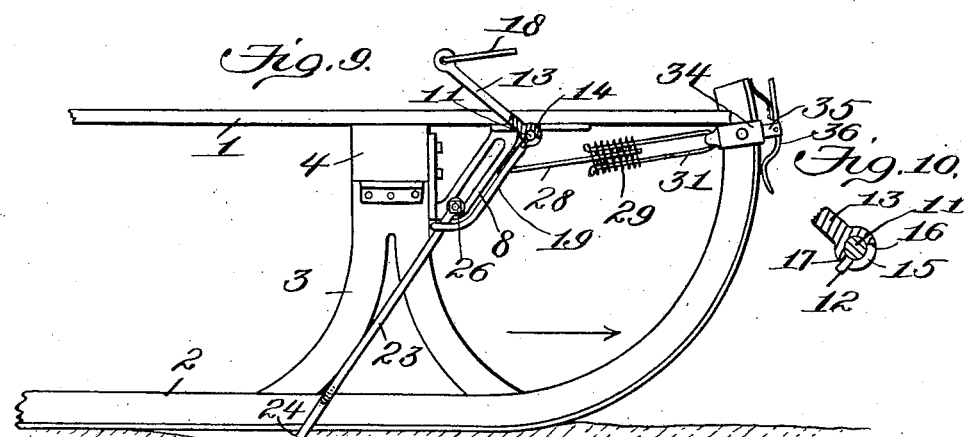
Witnesses:
C. J. Kesler
Inventor
John D. Hare
By James L. Norris
Atty.

UNITED STATES PATENT OFFICE.

JOHN D. HARE, OF McCOOK, NEBRASKA.

SLED-BRAKE.

No. 870,361.  Specification of Letters Patent.  Patented Nov. 5, 1907.

Application filed April 2, 1907. Serial No. 365,979.

*To all whom it may concern:*

Be it known that I, JOHN D. HARE, a citizen of the United States, residing at McCook, in the county of Redwillow and State of Nebraska, have invented new and useful Improvements in Sled-Brakes, of which the following is a specification.

This invention relates to "sled brakes", and has for its object to provide a brake that may be quickly and easily applied, as well as being strong and serviceable in use.

A further object of the invention is to provide a sled brake in a manner as hereinafter set forth which can be readily used for checking the advance of the sled, and, furthermore, which will pass an obstruction without breaking the mechanism.

A further object of the invention is to provide a sled brake in a manner as hereinafter set forth, which can be operated without the driver leaving his seat, and, furthermore, to so set up the initial starting mechanism for applying the brake as to enable such mechanism to be returned to normal position in advance of the return of the brake to inoperative position, such arrangement facilitating the application of the brake when occasion so requires.

A further object of the invention is to provide a sled brake in a manner as hereinafter set forth, which, after being initially started to cause its application, will be automatically shifted to operative position by the travel of the sled.

A further object of the invention is to provide the brake shoe in a manner as hereinafter set forth with a spring-actuated means for automatically returning the brake shoe to inoperative position.

Further objects of the invention are to provide a sled brake which shall be simple in its construction, readily applied, strong, durable, efficient in its use, readily set up with respect to the runner of the sled and comparatively inexpensive to manufacture.

With the foregoing and other objects in view the invention consists of the novel combination, construction and arrangement of parts hereinafter more specifically described and illustrated in the accompanying drawings, wherein is shown the preferred embodiment of the invention, but it is to be understood that changes, variations and modifications can be resorted to which come within the scope of the claims hereunto appended.

In describing the invention in detail reference is had to the accompanying drawings wherein like characters denote corresponding parts throughout the several views, and in which—

Figure 1 is a perspective view of a sled brake mechanism in accordance with this invention, showing the application of the shoe to braking position; Fig. 2 is a sectional plan of the runner, showing the shoe and the shifting links therefor; Fig. 3 is a sectional side elevation of a sled broken away, showing the brake in inoperative position; Fig. 4 is a detail showing a modified form of actuating links for the brake shoe; Fig. 5 is a side elevation of a sled showing the brake mechanism in inoperative position; Fig. 6 shows the first position of the initial starting device for the brake; Fig. 7 is a view similar to Fig. 5, showing the position of the brake after the initial start; Fig. 8 shows the second position of the initial starting means; Fig. 9 is a view similar to Fig. 5 showing the brake applied, and, Fig. 10 is a detail showing the normal position of the initial starting means for the brake.

The sled brake illustrated is shown as applied to but one runner, but it is evident that the two runners can be provided with a brake mechanism.

Referring to the drawings by reference characters, 1 denotes the bottom of a sled, 2 the runner, 3 the runner brace and 4 a support for the bottom 1. The bottom 1, as well as the brace 3 is secured to the support 4 in any desirable manner.

Secured to the support 4 is a vertically-extending plate 5, and secured to the lower face of the bottom 1 in advance of the support 4 is a longitudinally-extending plate 6. Formed integral with the lower end of the plate 5 and the rear end of the plate 6 is a forwardly-inclined arm 8 having an elongated slot 9 which extends in the same direction as the arm—that is to say, forwardly-inclined. Arranged below the bottom 1 and connected thereto through the medium of the keepers 10 is a rock shaft 11 which projects from one side of the bottom 1 and on said projecting end a lug 12 is provided. Mounted upon the projecting end of the rock shaft 11 is a link 13 having the portion thereof which is mounted upon the shaft 11 enlarged as at 14, so as to constitute a sleeve which is slotted, as at 15 to form the shoulders 16 and 17. The lug 12 upon the rock shaft 11 is positioned within the slot 15 formed in the sleeve 14 and the said lug 12 is adapted to be alternately engaged by the shoulders 16, 17. The link 13 at its upper end is attached, through the medium of the connection 18, with any suitable means whereby the link 13 can be actuated. The initial position of the link 13 is such that the shoulder 16 engages the lug 12. If the link 13 is pulled forwardly the shoulder 16 bearing upon the lug 12 will rock the shaft 11. The position, then, of the link 13 with respect to the shaft 11 will be that shown in Fig. 8. This is the extent of movement imparted to the shaft 11 by the link 13. The shaft 11, however, will have its movement continued in a manner as hereinafter set forth to the position shown in Fig. 10, but in the meantime the link 13 is moved back to normal position. If the actuating means for the link 13 is released said link will be caused to resume its normal position through the action of the spring 13ª, which is attached at one end to the shaft 11 and at its other end to the said link. By such arrangement the initial starting means will be automatically returned to normal position, consequently it is not necessary to await the return of the brake mechanism to inoperative position before the return of the initial starting means to normal.

Fixed to the rock shaft 11 is a pair of links 19 and 20 having the free ends thereof bent in a curvilinear manner, as at 21, so as to project away from the sled bottom 1. The curvilinear ends of the links 19, 20 are formed with enlarged openings 22 through which extend the shoe-carrying arms 23, these latter being positioned one at each side of the runner 2 and terminating at the outer end of the brake shoe 24 which extends transversely of the runner 2. The inner ends of the arms 23 are bent towards each other as at 25 and are connected together by the hold-fast device 26 which extends through the slot 9 in the arm 8, the walls of the slot 9 constituting a guide for the inner ends of the arms 23. The links 19 and 20 when the shaft 11 is actuated are adapted to ride upon the arms 23, thereby causing the arms to lower, which in turn will carry the brake shoe 24 therewith and move the shoe to the position shown in Fig. 7—that is to say in contact with the snow or ice.

Formed integral with the rock shaft 11 is a crank arm 27 having a recess in its free end in which extends a bail 28. The bail 28 extends through a compression spring 29 and has the free ends of the arms thereof bent at right angles as at 30 so as to overlap one end of the spring 29. Extending through the spring 29 in a direction opposite to that in which the bail 28 extends is a bail 31 having the free ends of its arms bent at right angles as at 32 so as to overlap the other end of the spring 29. By such construction the spring 29 is confined between the angular ends 30 of the bail 28 and the angular ends 32 of the bail 31, and when the bail 28 is carried rearwardly during the shifting of the crank arm 27 by the rocking of the shaft 11 the spring 29 will be compressed between the angular ends 30 and 32 of the bails. The bail 30 at its forward end is pivoted in a keeper 33 carried by a collar 34 which is fixed to the head of the runner 2 in close proximity to the forward end of the bottom 1 of the sled. The collar 33 has projecting from its forward face a pair of apertured lugs 35 in which is pivoted a spring catch 36 which bears against the front of the runner 2. The function of the catch 36 is to hold the shoe 24 and arms 23 in inoperative position, or in other words in parallelism with respect to the bottom 1 of the sled as shown in Figs. 3 and 5.

When the shaft 11 is initially started by the link 13 the links 19 and 20 bearing upon the arms 23 will shift the shoe free of the catch 36 and to the position shown in Fig. 7, that is to say, the shoe contacting with the snow or ice. During such movement the spring 29 will be compressed. As the sled continues to travel the shoe 24 will be caused to assume the position shown in Fig. 9, the hold-fast device 26 being at the lower end of the slot 9. Now it will be assumed that it is desirable to cause the brake to assume an inoperative position. Such action is had by backing the sled which would cause the shoe to assume the position shown in Fig. 7. During the backing of the sled and the moving of the shoe 24 to the position shown in Fig. 7 the hold fast device 26 will travel up the slot 9. When the shoe 24 assumes the position shown in Fig. 7 the spring 29 will expand and carry the bail 28 therewith, such action rocking the shaft 11 forwardly and causing the links 19 and 20 to lift the arms 23 and shift the shoe 24 to be engaged by the catch 36 the latter then retaining the brake mechanism in an inoperative position.

The arms 23 when the brake mechanism is set up are inserted through the openings 22 in the ends 21 of the links 19 and 20 and the said arms 23 are then secured together by the hold-fast devices 26 which extend through the slot 9. In lieu of constructing the links 20 so that the bent ends 21 will each be formed of one piece, such links can be set up in a manner as shown in Fig. 4 and in said view the links are indicated by the reference character 37, and each of the free ends thereof is formed of a stationary and a hinged section 38, 39, respectively. The section 39 is hinged to the section 38 as at 40 and has its free end connected to the section 38 as at 41. When employing the form of link shown in Fig. 4 the sections 38 are placed upon the arms 23 and the sections 39 then swung around the arms and secured to the sections 38 as at 41.

What I claim is—

1. A sled brake comprising a rock shaft, actuating means therefor, a pair of shiftable arms, a brake shoe carried thereby, and links fixed at one end to the rock-shaft and at the other end slidably mounted upon said arms for shifting them to initially position the brake shoe when the rock shaft is actuated by said means.

2. A sled brake comprising a rock shaft, actuating means therefor, a pair of shiftable arms, a brake shoe carried thereby, links connected to said arms for shifting them to initially position the brake shoe when the rock shaft is actuated by said means, and means for automatically returning the brake shoe to inoperative position.

3. A sled brake comprising a rock shaft, actuating means therefor, a pair of shiftable arms, a brake shoe carried thereby, links connected to said arms for shifting them to initially position the brake shoe when the rock shaft is actuated by said means, and means for returning said actuating means to normal position in advance of the return of the brake shoe to inoperative position.

4. A sled brake comprising a rock shaft, actuating means therefor, a pair of shiftable arms, a brake shoe carried thereby, links connected to said arms for shifting them to initially position the brake shoe when the rock shaft is actuated by said means, means for automatically returning the brake shoe to inoperative position, and means for returning said actuating means to normal position in advance of the return of the brake shoe to inoperative position.

5. A sled brake comprising a pair of shoe-carrying arms, a slotted supporting means for the upper end of said arms, a shoe carried by the lower end of said arms, a rock shaft, means depending from said rock shaft and engaging with said arms for shifting them to apply the shoe to braking position, and means connected with said rock shaft for actuating it.

6. A sled brake comprising a pair of shoe-carrying arms, a slotted supporting means for the upper ends of said arms, a shoe carried by the lower end of said arm, a rock shaft, means depending from said rock shaft and engaging with said arms for shifting them to apply the shoe to braking position, means connected with said rock shaft for actuating it, and means whereby said actuating means can be returned to normal position in advance of the returning of the brake shoe to inoperative position.

7. A sled brake comprising a pair of shoe-carrying arms, a slotted supporting means for the upper ends of said arms, a shoe carried by the lower ends of said arms, a rock shaft, means depending from said rock shaft and engaging with said arms for shifting them to apply the shoe to braking position, means connected with said rock shaft for actuating it, and means for automatically returning said brake shoe to inoperative position.

8. A sled brake comprising a pair of shoe-carrying arms, a slotted supporting means for the upper ends of said arms, a shoe carried by the lower ends of said arms, a rock shaft, means depending from said rock shaft and engaging with said arms for shifting them to apply the shoe to braking position, means connected with said rock shaft for actuating it, means for automatically returning said brake shoe to inoperative position, and means whereby said actuating means can be returned to normal position in advance of the return of the brake shoe to inoperative position.

9. A sled brake comprising a brake shoe, means for retaining said shoe in an inoperative position, means for releasing said shoe and shifting it to braking position, actuating means for said shifting and releasing means, means for automatically returning said shoe to inoperative position, and means whereby said actuating means can be returned to normal position in advance of the return of the brake shoe to inoperative position.

10. A sled brake comprising a pair of shoe-carrying arms, a shoe connected to the outer ends of said arms, a slotted supporting means for the other ends of said arms, means for retaining the shoe in an inoperative position, means for releasing and shifting the shoe to operative position, actuating means for said releasing and shifting means, and means for automatically returning said brake shoe to a position to be engaged by said retaining means.

11. A sled brake comprising a pair of shoe-carrying arms, a shoe connected to the outer ends of said arms, a slotted supporting means for the other ends of said arms, means for retaining the shoe in an inoperative position, means for releasing and shifting the shoe to operative position, actuating means for said releasing and shifting means, means for automatically returning said brake shoe to a position to be engaged by said retaining means, and means whereby said actuating means can be returned to normal position in advance of the return of the brake shoe to inoperative position.

In testimony whereof I have hereunto set my hand in presence of two subscribing witnesses.

JOHN D. HARE.

Witnesses:
  C. E. ELDRED,
  C. H. BOYLE.